US005695304A

United States Patent [19]

Ebert

[11] Patent Number: 5,695,304

[45] Date of Patent: Dec. 9, 1997

[54] FORSTNER BIT

[75] Inventor: Winfried Ebert, Weibern, Germany

[73] Assignee: Wolfcraft GmbH, Weibern, Germany

[21] Appl. No.: 505,632

[22] Filed: Jul. 21, 1995

[30] Foreign Application Priority Data

Nov. 5, 1994 [DE] Germany .......................... 94 17 778.3

[51] Int. Cl.[6] ...................................................... B23B 51/00

[52] U.S. Cl. ..................... 408/227; 408/233; 408/239 R; 408/226

[58] Field of Search .................................... 408/225, 226, 408/227, 229, 230, 233, 231, 239 R

[56] References Cited

U.S. PATENT DOCUMENTS

| | | | |
|---|---|---|---|
| 0,041,517 | 2/1864 | Low et al. | 408/233 X |
| 0,804,602 | 11/1905 | Howk | 408/233 |
| 3,521,507 | 7/1970 | Yogus et al. | 408/239 |
| 3,658,435 | 4/1972 | Kubicek | 408/226 |
| 3,945,753 | 3/1976 | Byers et al. | 408/214 X |
| 4,090,807 | 5/1978 | Stewart | 408/225 X |
| 4,405,269 | 9/1983 | Hertzler | 408/226 X |
| 4,449,865 | 5/1984 | Yankovoy et al. | 408/225 X |
| 4,753,558 | 6/1988 | Jansson | 408/225 X |
| 5,092,719 | 3/1992 | Zsiger | 408/230 X |
| 5,399,051 | 3/1995 | Aken et al. | 408/230 X |

*Primary Examiner*—Daniel W. Howell
*Assistant Examiner*—Henry W.H. Tsai
*Attorney, Agent, or Firm*—Antonelli, Terry, Stout & Kraus, LLP

[57] ABSTRACT

A Forstner bit including a cutter having radial major cutting edges, circumferential cutting edges and a shank adapted to be clamped in a chuck. The cutter is threadably attached to the shank by a rear stem of the cutter being accommodated in a threaded hole provided in the shank. The cutter is formed as a monolithic casting fashioned of a precision-casting steel alloy, with the cutter being subjected to additional grinding only along the major cutting edges and the circumferential cutting edges.

14 Claims, 1 Drawing Sheet

FORSTNER BIT

BACKGROUND OF THE INVENTION

1. Field of the Invention

The present invention relates to a Forstner bit with a cutter having radial major cutting edges, circumferential cutting edges and a shank that can be clamped in a chuck, with a cutter being provided with a threaded rear stem insertable into a threaded hole in the shank.

2. Description of the Prior Art

Forstner bits have been fabricated by being turned and milled from steel blanks; however, in view of the complicated geometric shape of the cutter, the usual practice as described, for example, in DE-GM 94 00 892 and DE-PS 36 23 559, has been to manufacture the Forstner bit in several pieces and threadably attach the several pieces of the cutter together. Despite this multipart structure, the proposed Forstner bits are relatively expensive.

SUMMARY OF THE INVENTION

The objective of the present invention is to provide a Forstner bit, intended particularly for the homeowner handyperson, which may be fabricated as a moderately priced mass-produced item.

In accordance with the present invention, the cutter is a one-piece or monolithic casting which is fashioned of a precision-casting steel alloy, with the cutter being subsequently subjected to additional grinding only along its major cutting edges and circumferential cutting edges, and with a rear stem of the cutter having a threading cut therein so as to enable the cutter to detachably connected to a shank having a threaded hole therein. Preferably, the cutter is fashioned of CK 45-DIN steel.

By virtue of the Forstner bit constructed in accordance with the present invention, only the shank is fabricated by being turned and milled from a blank, while the geometrically complicated cutter is fabricated as a moderately priced monolithic casting to which only minor additional machining must be carried out. Overall, this results in a very modestly priced Forstner bit that is characterized by excellent cutting ability and a long service life.

The Forstner bit of the present invention has a particular advantage if a set of cutters of different sizes is provided for the clamping shank since the user then needs only purchase one shank into which the user threadably attaches the comparatively low-cost precision-cast cutter that may be required for a given application in question.

According to further features of the present invention, the stem of the cutter includes a collar, contiguous with a bottom of the cutter, with the collar resting on a face of the shank when the stem is threadably attached to the shank. The cutter may also be provided with smooth spots or portions for enabling an application of a tool to facilitate the threadable attaching of the cutter to the shank. The stem of the cutter may be provided with a smooth walled cylindrical plug-end section contiguous with the collar, with the plug-in section being snugly accommodated in an upper plug receiving hole in the shank. The threading is cut in a reduced diameter section of the stem, with the reduced diameter section being contiguous with the rear or lower end of the plug-in section, with a groove being interposed between the lower end of the plug-in section and the reduced diameter section. The threaded portion of the rear stem is threadably inserted into a threaded hole in the shank.

BRIEF DESCRIPTION OF THE DRAWINGS

The above and other objects, features, and advantages of the present invention will become more apparent from the following description when taken in connection with the accompanying drawing which shows, for the purpose of illustration only, one embodiment in accordance with the present invention, and wherein.

DETAILED DESCRIPTION OF THE PREFERRED EMBODIMENT

Figure 1:
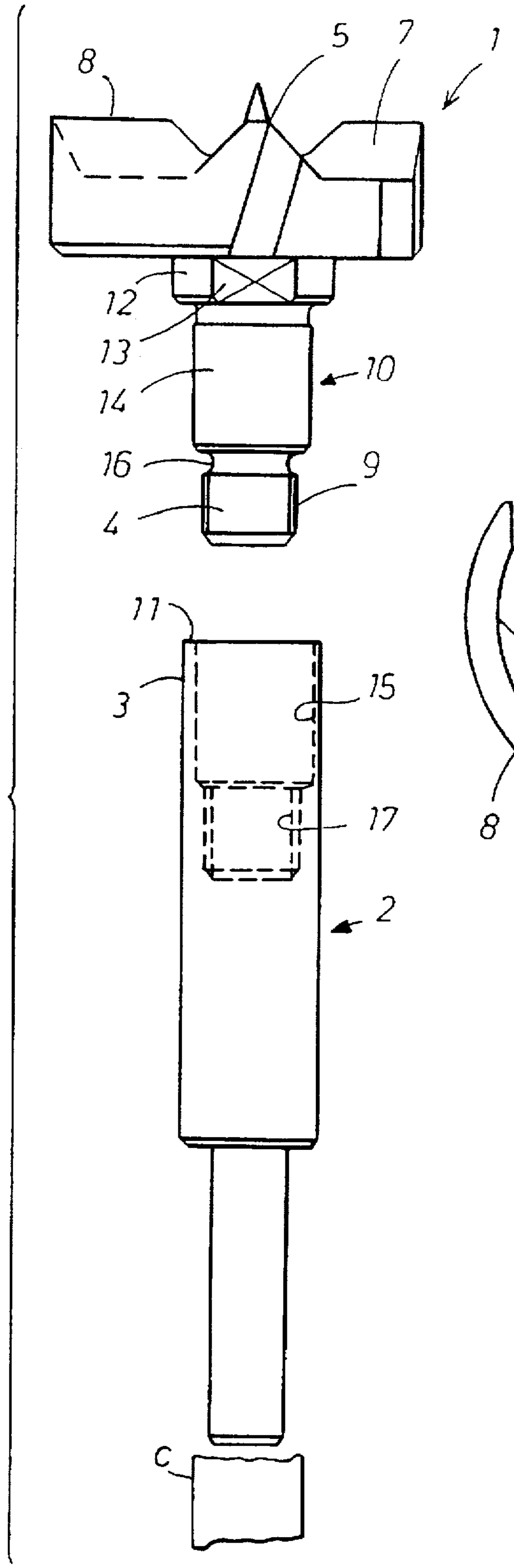
FIG. 1 is an exploded view of a two-piece Forstner bit constructed in accordance with the present invention.

Referring now to the drawing wherein like reference numerals are used in both views to designate like parts and, more particularly, to FIG. 1, a Forstner bit according to the present invention includes a cutter generally designated by the reference numeral 1 and a shank generally designated by the reference numeral 2 adapted to be clamped in a chuck C. The cutter 1 is adapted to be detachably secured to a working-side end 3 of the shank 2. The cutter 1 may be fashioned of CK 45-DIN steel. For this purpose, the cutter 1 is provided with a rear threaded stem portion 4.

Figure 2:
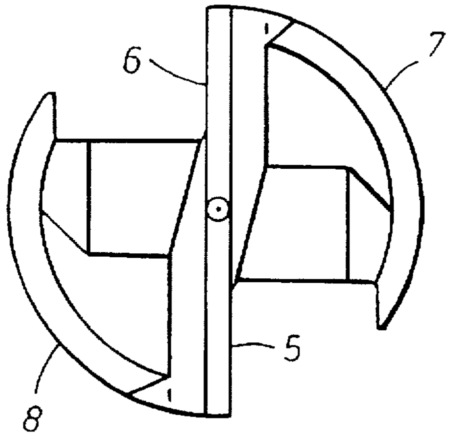
FIG. 2 is a top-plan view of the Forstner bit of FIG. 1.

The cutter 1 is fashioned of a precision monolithic casting, which is essentially cast in a final form, with only major cutting edges 5, 6 and circumferential cutting edges 7, 8, shown most clearly in FIG. 2, being subjected to additional grinding and with threading 9 being cut into the threaded stem portion 4.

The threaded stem portion 4 is a part of a stepped stem generally designated by the reference numeral 10 which is monolithically cast with a bottom of the cutter 1 and which, contiguous with the bottom of the cutter, has a collar 12 adapted to rest on a face 11 of the shank tube. The collar 12 is provided with smooth spots or sections 13 for enabling an application of a tool to facilitate the threadable attaching of the cutter 1 to the shank 2. A smooth walled cylindrical plug-in section 14, is connected to the collar 12 by monolithic casting the plug-in section 14 with a bottom of the collar 12. The plug-in section 14 is adapted to be snugly inserted into an upper plug receiving hole 15 of the shank 2. A groove 16 is formed between the plug-in section and a reduced diameter portion forming the threaded stem portion 4. The threaded stem portion 4 is adapted to be threadably inserted into a threaded hole 17 of the shank 2.

A set of additional cutters 1 can be provided for use with the shank 2, with the set of cutters including cutters of different sizes but with all of the cutters being identically constructed with respect to the of the stem 10.

I claim:

1. A Forstner bit comprising a cutter including radial major cutting edges, circumferential cutting edges, a shank adapted to be clamped in a chuck, and including an end face and a threaded hole, wherein the cutter is formed as a monolithic casting fashioned of a precision-casting steel alloy including ground edges only along the radial major cutting edges and circumferential cutting edges, and wherein said cutter includes a rear stem having a threading cut therein, the shank includes a cylindrical opening in the end face of the shank which extends towards the threaded hole with the cylindrical opening being of a larger diameter than a diameter of the threaded hole; and the rear stem includes a cylindrical section disposed between the rear part and the threading with the cylindrical section being of a larger diameter than a diameter of the threading and snugly engaging the cylindrical opening when the threading engages the threaded hole.

2. A Forstner bit according to claim 1, wherein the cutter is fashioned of CK 45-DIN steel.

3. A Forstner bit according to claim 2, wherein a plurality of different size cutters are provided and are adapted to be mounted on said shank.

4. A Forstner bit according to claim 3, wherein, contiguous with a bottom of the cutter, the rear stem includes a collar adapted to rest on an end face of the shank when the cutter is attached to said shank, a portion for enabling an application of a tool when said cutter is attached to said shank, a smooth-walled plug-in section contiguous with the collar, an annular groove contiguous with a lower end of the plug-in section, and a reduced diameter portion, contiguous with the annular groove, in which the threading in the threaded hole is cut, and wherein the shank includes a plug-receiving hole in an upper end thereof for receiving said plug-in section and a threaded hole for threadably accommodating the threading of the rear stem thereby enabling the cutter to be threadably fastened to the shank.

5. A Forstner bit according to claim 1, wherein a plurality of different size cutters are provided and are adapted to be mounted on said shank.

6. A Forstner bit according to claim 1, wherein, contiguous with a bottom of the cutter, the rear stem includes a collar adapted to rest on an end face of the shank when the cutter is attached to said shank, a portion for enabling an application of a tool when said cutter is attached to said shank, a smooth-walled plug-in section contiguous with the collar, an annular groove contiguous with a lower end of the plug-in section, and a reduced diameter portion, contiguous with the annular groove, in which threading in the threaded hole is cut, and wherein the shank includes a plug-receiving hole in an upper end thereof for receiving said plug-in section and a threaded hole for threadably accommodating the threading of the rear stem thereby enabling the cutter to be threadably fastened to the shank.

7. A Forstner bit according to claim 2, wherein, contiguous with a bottom of the cutter, the rear stem includes a collar adapted to rest on an end face of the shank when the cutter is attached to said shank, a portion for enabling an application of a tool when said cutter is attached to said shank, a smooth-walled plug-in section contiguous with the collar, an annular groove contiguous with a lower end of the plug-in section, and a reduced diameter portion, contiguous with the annular groove, in which threading in the threaded hole is cut, and wherein the shank includes a plug-receiving hole in an upper end thereof for receiving said plug-in section and a threaded hole for threadably accommodating the threading of the rear stem thereby enabling the cutter to be threadably fastened to the shank.

8. A Forstner bit comprising a cutter including radial major cutting edges and circumferential cutting edges disposed on a front part of the cutter and a point located on a longitudinal axis of the bit which projects forward along the longitudinal axis beyond the front part with a tip of the point being disposed on the longitudinal axis beyond a location of the cutting edges relative to the longitudinal axis, a shank adapted to be clamped in a chuck, and including an end face and a threaded hole, wherein the cutter is formed as a monolithic casting of a steel alloy including ground edges only along the radial major cutting edges and circumferential cutting edges, and wherein said cutter includes a rear stem projecting from a rear part of the cutter opposed to the front part and having a threading cut therein which engages the threaded hole, the shank includes a cylindrical opening in the end face of the shank which extends towards the threaded hole with the cylindrical opening being of a larger diameter than a diameter of the threaded hole; and the rear stem includes a cylindrical section disposed between the rear part and the threading with the cylindrical section being of a larger diameter than a diameter of the threading and snugly engaging the cylindrical opening when the threading engages the threaded hole.

9. A Forstner bit according to claim 8, wherein the cutter is fashioned of CK 45-DIN steel.

10. A Forstner bit according to claim 9, wherein a plurality of different size cutters are provided and are adapted to be mounted on said shank.

11. A Forstner bit according to claim 10, wherein, contiguous with a bottom of the cutter, the rear stem includes a collar adapted to rest on an end face of the shank when the cutter is attached to said shank, a portion for enabling an application of a tool when said cutter is attached to said shank, a smooth-walled plug-in section contiguous with the collar, an annular groove contiguous with a lower end of the plug-in section, and a reduced diameter portion, contiguous with the annular groove, in which threading is cut, and wherein the shank includes a plug-receiving hole in an upper end thereof for receiving said plug-in section and a threaded hole for threadably accommodating the threading of the rear stem thereby enabling the cutter to be threadably fastened to the shank.

12. A Forstner bit according to claim 8, wherein a plurality of different size cutters are provided and are adapted to be mounted on said shank.

13. A Forstner bit according to claim 8, wherein, contiguous with a bottom of the cutter, the rear stem includes a collar adapted to rest on an end face of the shank when the cutter is attached to said shank, a portion for enabling an application of a tool when said cutter is attached to said shank, a smooth-walled plug-in section contiguous with the collar, and annular groove contiguous with a lower end of the plug-in section, and a reduced diameter portion, contiguous with the annular groove, in which the threading is cut, and wherein the shank includes a plug-receiving hole in an upper end thereof for receiving said plug-in section and a threaded hole for threadably accommodating the threading of the rear stem thereby enabling the cutter to be threadably fastened to the shank.

14. A Forstner bit according to claim 9, wherein, contiguous with a bottom of the cutter, the rear stem includes a collar adapted to rest on an end face of the shank when the cutter is attached to said shank, a portion for enabling an application of a tool when said cutter is attached to said shank, a smooth-walled plug-in section contiguous with the collar, and annular groove contiguous with a lower end of the plug-in section, and a reduced diameter portion, contiguous with the annular groove, in which the threading is cut, and wherein the shank includes a plug-receiving hole in an upper end thereof for receiving said plug-in section and a threaded hole for threadably accommodating the threading of the rear stem thereby enabling the cutter to be threadably fastened to the shank.

* * * * *